(12) United States Patent
Takano

(10) Patent No.: US 7,680,461 B2
(45) Date of Patent: Mar. 16, 2010

(54) WIRELESS COMMUNICATIONS SYSTEM, WIRELESS COMMUNICATIONS METHOD, AND WIRELESS COMMUNICATIONS APPARATUS

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 1210 days.

(21) Appl. No.: 10/946,074

(22) Filed: Sep. 22, 2004

(65) Prior Publication Data

US 2005/0095996 A1 May 5, 2005

(30) Foreign Application Priority Data

Nov. 5, 2003 (JP) ............................. 2003-375504

(51) Int. Cl.
*H04B 1/00* (2006.01)
(52) U.S. Cl. ..................... 455/69; 370/328; 375/267
(58) Field of Classification Search ............. 455/68–69; 370/310, 328; 375/267
See application file for complete search history.

(56) References Cited

U.S. PATENT DOCUMENTS

| 5,936,569 | A | | 8/1999 | Ståhle et al. | |
|---|---|---|---|---|---|
| 6,058,105 | A | * | 5/2000 | Hochwald et al. | 370/310 |
| 6,760,388 | B2 | * | 7/2004 | Ketchum et al. | 375/295 |
| 7,068,981 | B2 | * | 6/2006 | Sim | 455/101 |
| 7,116,725 | B2 | | 10/2006 | Ketchum et al. | |
| 2003/0031264 | A1 | * | 2/2003 | Barry et al. | 375/259 |
| 2003/0130003 | A1 | * | 7/2003 | Won | 455/522 |
| 2004/0082356 | A1 | * | 4/2004 | Walton et al. | 455/522 |
| 2004/0136349 | A1 | | 7/2004 | Walton et al. | |
| 2004/0192218 | A1 | * | 9/2004 | Oprea | 455/73 |
| 2004/0252632 | A1 | * | 12/2004 | Bourdoux et al. | 370/210 |

FOREIGN PATENT DOCUMENTS

| JP | 2001-53661 | 2/2001 |
|---|---|---|
| JP | 2001-510668 | 7/2001 |
| JP | 2003-60557 | 2/2003 |
| JP | 2003-264492 | 9/2003 |
| JP | 2005-512447 | 4/2005 |
| JP | 2006-504370 | 2/2006 |
| WO | WO 03/050968 A2 | 6/2003 |
| WO | WO 03/069816 A2 | 8/2003 |
| WO | WO 2004/054191 A1 | 6/2004 |

* cited by examiner

*Primary Examiner*—Quochien B Vuong
(74) *Attorney, Agent, or Firm*—Oblon, Spivak, McClelland, Maier & Neustadt, L.L.P.

(57) ABSTRACT

In an SVD-MIMO transmission using a singular value decomposition, the amount of information fed back to a transmitter from a receiver is reduced. Instead of feeding back to the transmitter, a transmission weighting vector V obtained by performing a singular value decomposition of a channel information matrix obtained by the receiver, the receiver sends reference symbols to the transmitter, which obtains the channel information matrix and performs the singular value decomposition to yield the vector V necessary when transmitting data. In the procedure of obtaining the vector V, a noncoincidence between channel matrices in the opposite directions is compensated for, by performing a calibration for compensating an error between transmitting and receiving analog devices on the part of both the transmitter and the receiver.

8 Claims, 7 Drawing Sheets

F I G. 3
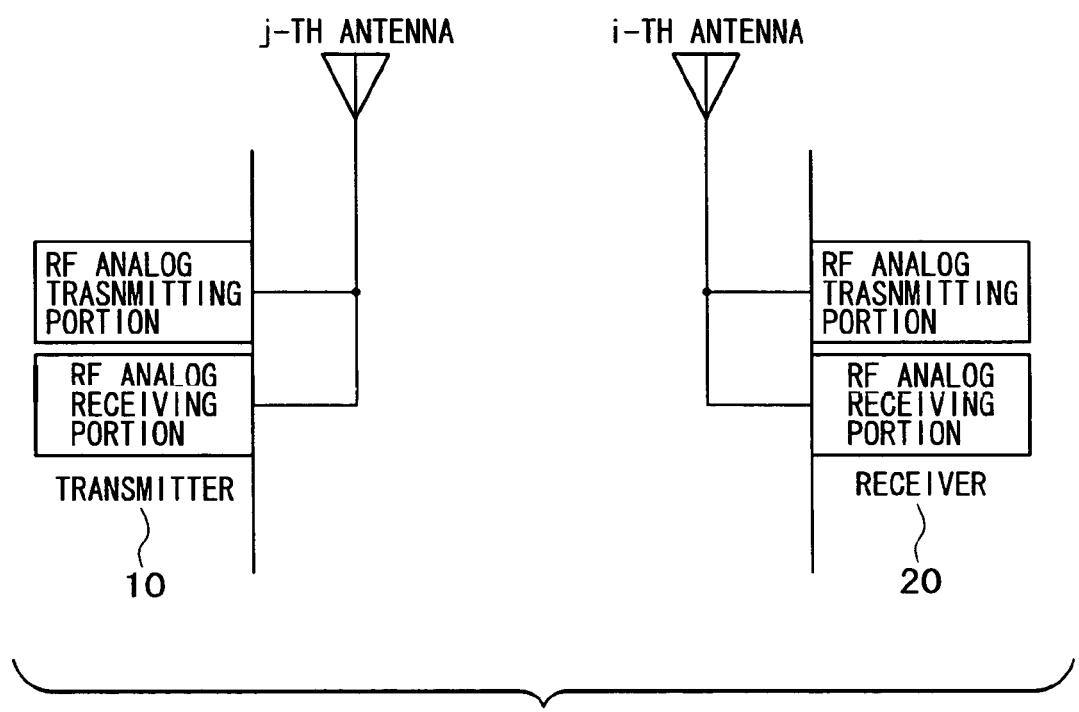

F I G. 4
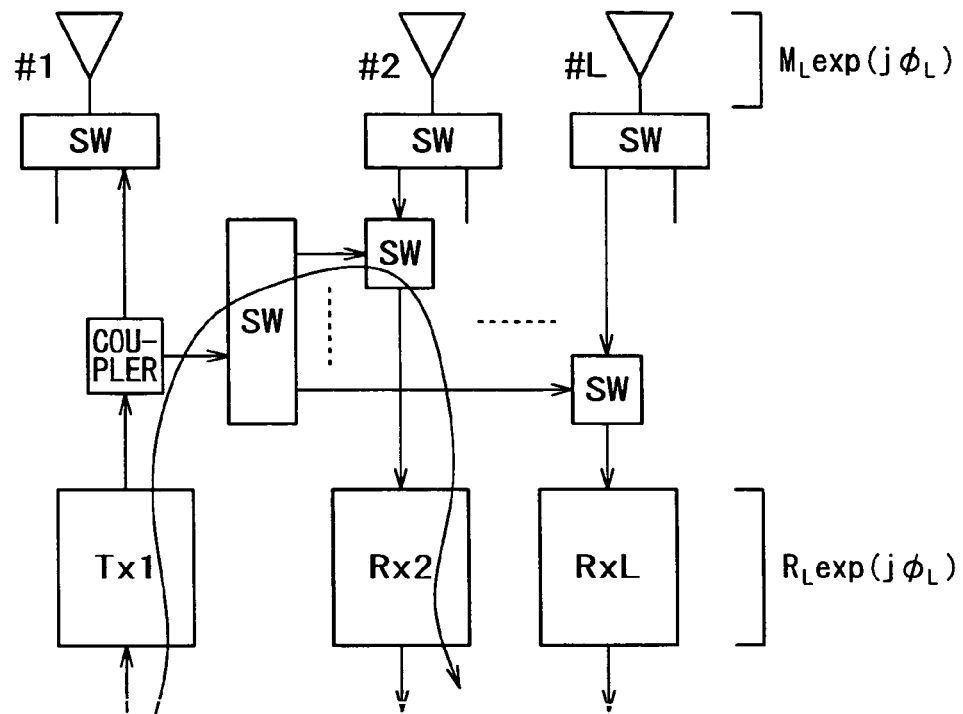
F I G. 5
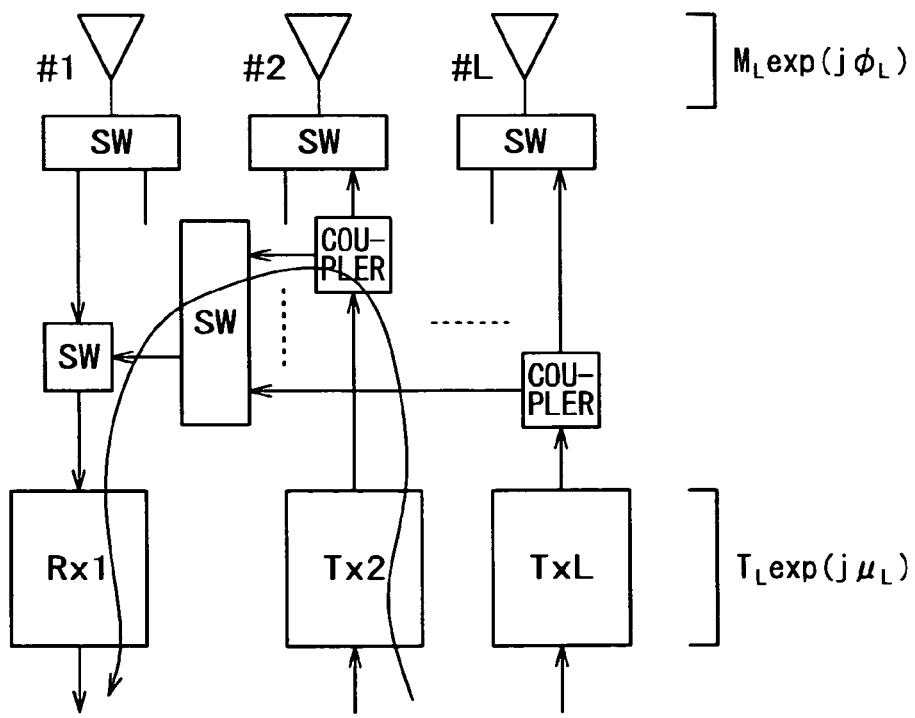

$H = UDV^H$ $H = U^H UDV^H VX = DX$ $$D = \begin{bmatrix} \sqrt{\lambda_1} & \cdots & 0 \\ \vdots & \ddots & \vdots \\ 0 & \cdots & \sqrt{\lambda_1} \end{bmatrix}$$

PRIOR ART

WIRELESS COMMUNICATIONS SYSTEM, WIRELESS COMMUNICATIONS METHOD, AND WIRELESS COMMUNICATIONS APPARATUS

BACKGROUND OF THE INVENTION

1. Field of the Invention

The present invention relates to a system, apparatus, method and computer program for a wireless communication among a plurality of wireless stations, such as a communication by a wireless LAN (Local Area Network). In particular, the invention relates to such a system, method and apparatus which realize a broadband wireless transmission in home or other similar communication environments.

More specifically, this invention relates to a system, apparatus, method and computer program which enhance the transmission capacity by employing a communication where a transmitter and a receiver each having a plurality of antennas communicate with each other using space division multiplexing, that is, MIMO communication; in particular, the invention relates to such a system, method and apparatus, which are adapted to perform MIMO transmission using a singular value decomposition (SVD) of a channel information matrix each element in which represents propagation information of one of sub-channels each linking a pair of an antenna of the transmitter and an antenna of the receiver.

2. Description of Related Art

Computer networking such as LAN efficiently enables to share information and apparatus resources. Wireless LAN is attracting attention of people as a system for relieving users from the conventional wired LAN construction. In a working space such as an office, most of cables and wires can be dispensed with by employing a wireless LAN, facilitating relocation of a communication terminal such as a personal computer.

Recently, demand for wireless LAN has increased with the speed improvement and price-reduction of wireless LAN. In particular, to establish a small wireless network of a plurality of electronic devices present around people so as to enable communications thereamong, introduction of Personal Area Network (PAN) is considered. For instance, there are defined various wireless communications systems and apparatuses using respective frequency bands, e.g. 2.4 GHz and 5 GHz bands, which are permitted for use without a license from the supervisory authority.

One of the standards related to wireless networking is IEEE (the Institute of Electrical and Electronics Engineers) 802.11 (see nonpatent literature 1). IEEE 802.11 standard is further divided, depending upon the employed methods and used frequencies, into IEEE 802.11a, IEEE 802.11b ... etc., defining respective wireless communications methods.

IEEE 802.11a standard supports a modulation method achieving a communication speed of up to 54 Mbps. However, there is demand for a wireless standard capable of realizing a higher bit rate as the communication speed. In this situation, MIMO (Multi-Input Multi-Output) communication technology has recently attracted increased attention. This technology is for enhancing the communication speed by providing both of the transmitter and receiver with a plurality of antennas, so as to realize space division multiplexing, i.e., a plurality of sub-channels which are logically independent of one another, to increase the transmission capacity. Using the space division multiplexing, MIMO is bandwidth-efficient.

FIG. 7 schematically shows a MIMO communications system, where each of a transmitter and a receiver is quipped with a plurality of antennas. The transmitter space-time encodes N data for transmission to be multiplexed, and distributes the encoded data to M antennas of the transmitter from which the data are sent over a channel to the receiver in a multiplexed fashion. The receiver receives and space-time decodes the data received through N antennas thereof via the channel, to obtain received data. Thus, a MIMO communication is not the same as a communication by a simple transmission/reception adaptive array. In MIMO, the channel model involves an RF environment (transfer function) on the side of the transmitter, a construction (transfer function) of the channel space, and an RF environment (transfer function) on the side of the receiver. When a signal is transmitted from antennas in a multiplexed fashion, crosstalk occurs; by signal processing performed on the part of the receiver, the multiplexed signal is retrieved correctly.

In brief, a MIMO system is such that the transmitter sends out the transmitted data or signal by distributing components of the data to the plural antennas thereof (hereinafter referred to as "transmit antennas"), and the receiver obtains received data by processing the signal components received through the plural antennas thereof (hereinafter referred to as "receive antennas"), and is a communications system utilizing a characteristic of the channel. Although there are various applications of the MIMO transmission technology, SVD-MIMO system as one of ideal modes of MIMO is known that uses SVD (Singular Value Decomposition) of a propagation function. See Patent Document 2, and Nonpatent Literature 2, for instance.

FIG. 8 schematically shows a SVD-MIMO transmission system, where a matrix of numbers, i.e., a channel information matrix H, each of whose elements represents information on each of sub-channels linking respective antenna pairs, is subjected to a singular value decomposition to obtain $UDV^H$, and an antenna weighting coefficient matrix V on the part of the transmitter (hereinafter referred to as "transmit antenna weighting coefficient matrix V") and an antenna weighting coefficient matrix $U^{H'}$ on the part of the receiver (hereinafter referred to as "receive antenna weighting coefficient matrix $U^H$") are provided. Accordingly, the channel information is expressed by a diagonal matrix whose diagonal elements are square roots of respective eigenvalues $\lambda_i$. Thus, a signal can be transmitted in a multiplexed fashion without suffering from crosstalk at all. However, in the SVD-MIMO transmission system, it is not easy to perform the operation of the SVD in real time, and the set-up procedure such that the derived V or $U^H$ is beforehand communicated to the other part of the communication is essential.

It is possible to achieve the theoretically maximum communication capacity by the SVD-MIMO transmission system. For instance, where the transmitter and receiver respectively have two antennas, a transmission capacity of two times large at maximum can be achieved.

There will now be described the scheme of the SVD-MIMO transmission system. Where the numbers of antennas of the transmitter and receiver are M and N, respectively, transmitted signal x is represented as vector (M×1) while the received signal y is represented by vector (N×1). In this case, the channel information can be represented as a matrix H of N×M. An entry $h_{ij}$ of the channel information matrix H represents a transfer function with respect to a sub-channel from a j-th transmit antenna to an i-th receive antenna. A vector y representing the received signal equals to a multiplication of the matrix H by the vector of the transmitted signal, plus a noise vector n, and is expressed by the following equation (1):

$$y = Hx + n \quad (1)$$

The channel information matrix H subjected to the singular value decomposition as described above, is expressed by the following equation (2):

$$H = UDV^H \quad (2)$$

In equation (2), the transmit antenna weighting coefficient matrix V and receive antenna weighting coefficient matrix U are unitary matrices which respectively satisfy the following equations (3) and (4):

$$U^H U = I \quad (3)$$

$$V^H V = I \quad (4)$$

That is, the receive antenna weighting coefficient matrix $U^H$ is an array of normalized eigenvectors of $HH^H$, while the transmit antenna weighting coefficient matrix V is an array of normalized eigenvectors of $H^H H$. Further, D represents a diagonal matrix whose diagonal elements are square roots of respective eigenvalues of $H^H H$ or $HH^H$. The size of the matrix D corresponds to the smaller one of the numbers M and N of the transmit antennas and receive antennas, that is, the matrix D is a square diagonal matrix having a rank of min(M, N).

$$D = \begin{bmatrix} \sqrt{\lambda_1} & \cdots & & 0 \\ \vdots & \sqrt{\lambda_2} & & \\ & & \ddots & \\ 0 & & & \sqrt{\lambda_{min(M,N)}} \end{bmatrix} \quad (5)$$

In the above description related to the singular value decomposition, a case where only real numbers are involved is assumed. It is noted that in the case where imaginary numbers are also involved, even where eigenvectors of the matrices U and V, each of which is a matrix of eigenvectors, are manipulated so that the norm of each matrix is 1, that is, normalized, an infinite number of eigenvectors having respective phases, not a single eigenvector, exist. In some cases, the equation (2) can not be established depending upon the phase difference between U and V, namely, where U and V are correct but have different phases. To completely synchronize the phases, V is obtained as a matrix of eigenvectors of $H^H H$ as ordinary, while U is obtained by multiplying both terms of the equation (2) by V, as expressed by the following equation (6):

$$HV = UDV^H V = UDI = UD$$

$$U = HVD^{-1} \quad (6)$$

The transmitter weights the components of the signal for respective sub-channels by the transmit antenna weighting coefficient matrix V, while the receiver receives the signal with weighting the components by an inverse weighting coefficient matrix $U^H$; since each of U and V is a unitary matrix (U is a matrix of N×min(M, N) while V is a matrix of M×min(M, N)), the following expression is obtained:

$$y = U^H H V x + U^H n \quad (7)$$
$$= U^H (UDV^H) V x + U^H n$$
$$= (U^H U) D (V^H V) x + U^H n$$
$$= IDIx + U^H n$$
$$y = Dx + U^H n$$

The vectors y and x are not determined by the numbers of the antennas of the transmitter and the receiver, but are respectively expressed by (min(M, N)×1).

Since D is a diagonal matrix, each transmitted signal can be received without suffering from the crosstalk. The amplitude of each of the sub-channels which are independent from one another is proportional to the square root of the eigenvalue λ, and thus the power of each sub-channel is proportional to λ.

As to the noise component n, since the columns of U are the eigenvectors normalized so that the norm is 1, $U^H n$ does not affect the noise power of the received signal. $U^H n$ is a vector whose size is min(M, N), which is the same size as y and x.

As described above, in the SVD-MIMO transmission, plural independent logical sub-channels free from crosstalk even where occupying the same frequency band and the same time period can be obtained. This means that it is enabled to simultaneously transmit plural data using a same frequency band, improving the transmission speed.

In the SVD-MIMO system, the receiver must obtain the channel information matrix H, implement the singular value decomposition, and communicate $V^H$ as a factor of $UDV^H$ obtained as the result of the decomposition to the transmitter. In effect, the transmitter uses V and therefore V must be communicated to the transmitter.

An amount of information carried by the transmit antenna coefficient matrix V will be now discussed, by taking for example IEEE 802.11a which defines one of LAN systems where the SVD-MIMO transmission is applicable, namely, OFDM (Orthogonal Frequency Division Multiplexing) of 5 GHz band.

Where each of the transmitter and receiver has three antennas, the transmit antenna weighting coefficient matrix V is a 3×3 matrix, having nine elements. In this case, when each element is a complex number represented using 10 bits, and 52 carriers are provided, a total of 9360 bits of information, i.e., 9 (the number of elements of the matrix)×2 (the real and imaginary part of a complex number)×10×52 (the number of OFDM sub-carriers), has to be fed back to the transmitter from the receiver.

The MIMO requiring such feedback is called closed-loop MIMO, while the opposite thereof is open-loop MIMO. A closed-loop SVD-MIMO system must feedback information of that much (9360 bits) to the transmitter, upon initiation of a communication. Let us assume that the information is fed back where the most reliable one in the modulation schemes provided by IEEE 802.11a, i.e., BPSK is employed as a first modulation method, the coding rate is ½, and OFDM is employed as a second modulation method. Since 1 OFDM symbol can carry only 24 bits, 390 OFDM symbols are required for the transmission of the information, making the SVD-MIMO unpractical.

As one of embodiments for realizing the above-described set-up processing in the MIMO transmission by a relatively simple mechanism, a technique called V-BLAST is known. V-BLAST is an acronym of "Vertical Bell Laboratories Layered Space Time" and refers to a technology originally developed by the now-defunct AT & T Bell Laboratories. See Patent Documents 1, for instance.

FIG. 9 schematically shows a structure of a V-BLAST communications system. The major difference between the V-BLAST and SVD-MIMO systems is that the transmitter in the V-BLAST does not provide the antenna weighting coefficient matrix V, but simply multiplexes a signal with respect to the transmit antennas and the feedback processing for beforehand providing the antenna weighting coefficient matrix V is all omitted. The transmitter inserts, prior to sending the multiplexed signal, training signals to be used in channel estimation by the receiver, in the multiplexed signal. For instance, the training signals for respective antennas are inserted in the signal in a time division fashion. In the example of FIG. 9, the training signals are sent included in the data packet such that a training signal Training-1 corresponding to an antenna #1 is sent following a preamble signal and a training signal Training-2 corresponding to an antenna #2 is subsequently sent, in a time division fashion.

On the part of the receiver, a channel estimator thereof performs a channel estimation using the training signals, to calculate the channel information matrix H representing information on the sub-channels linking respective antenna pairs. A first antenna weighting coefficient matrix calculator performs zero-forcing or others for each of signals corresponding to the respective transmit antennas so as to cancel unnecessary signals, i.e., signals other than those for the respective receive antennas, and obtains a receive antenna weighting coefficient matrix $Z_R$. The transmitted signal having the highest S/N ratio among the signals retrieved after $Z_R$ is provided, is first decoded to obtain a signal $x_1$.

Next, the decoded signal is encoded again by an encoder to generate a replica (duplicate) of the transmitted signal $x_1$, which is canceled from the signals just received by the receive antennas. A second receive antenna weighting coefficient matrix calculator excludes the transmit antenna corresponding to the transmitted signal $x_1$ as canceled, and again applies zero-forcing criteria to each of the other signals, to calculate a receive antenna weighting coefficient matrix $Z_R'$. The signal $x_2$ exhibiting the highest S/N ratio among the remaining received signals is decoded by the decoder.

In the second decoding, since the transmitted signal as decoded first is eliminated, the degree of freedom of the receive antennas is enhanced and the effect of maximal ratio combining is accordingly improved. Thereafter, all transmitted signals as multiplexed are sequentially decoded by iteration of the above-described processing.

As described above, a characteristic of the V-BLAST resides in that zero-forcing and canceling are sophisticatedly combined so that even a signal whose S/N ratio can not be made sufficiently high only by application of zero-forcing criteria can be improved in S/N ratio by taking advantage of the degree of freedom of the antennas which is provided by the canceling, and thus the accuracy of the decoding is enhanced. Thus, the V-BLAST can realize an efficient MIMO transmission system by a combination of relatively simple mechanisms.

However, since the transmitter does not perform the weighting before the data transmission, the receiver is required to implement the first decoding only by zero-forcing, without performing the canceling operation. Thus, the number of receive antennas is made larger than that of the transmit antennas so as to obtain a redundancy in degree of freedom of the receive antennas. In the example shown in FIG. 9, two transmit antennas and three receive antennas are provided.

[Patent Document 1] JP-A-10-84324

[Patent Document 2] U.S. Pat. No. 6,058,105

[Nonpatent Literature 1] International Standard ISO/IEC 8802-11:1999 (E) ANSI/IEEE Std 802.11, 1999 Edition, Part 11: Wireless LAN Medium Access Control (MAC) and Physical Layer (PHY) Specifications

[Nonpatent Literature 2] http://radio3.ee.uec.ac.jp/MIMO (IEICE_TS).pdf (as of Oct. 24, 2003)

SUMMARY OF THE INVENTION

A first object of the present invention is to provide an excellent wireless communications system, wireless communication method and wireless communications apparatus, which realizes a broadband wireless transmission under a communication environment such as in a home.

A second object of the invention is to provide an excellent wireless communications system, wireless communication method and wireless communications apparatus, which can enhance the transmission capacity by implementing a communication (MIMO communication) using space division multiplexing between a transmitter and a receiver each having a plurality of antennas.

A third object of the invention is to provide an excellent wireless communications system, wireless communication method and wireless communications apparatus, which can suitably implement a MIMO communication using a singular value decomposition (SVD) of a channel information matrix whose elements respectively represent a gain on each sub-channel linking a pair of a transmitter and a receiver.

A fourth object of the invention is to provide an excellent wireless communications system, wireless communication method and wireless communications apparatus, which can reduce an amount of information fed back from a receiver to a transmitter in a SVD-MIMO transmission.

The present invention has been developed for attaining the above-described objects, and a first aspect of the invention provides a wireless communications system for a communication between a transmitter and a receiver each having a plurality of antennas, over a communications channel by multiplexing a signal, the system comprising:

a reference signal sender which feeds back reference signals for respective antennas of the receiver from the receiver to the transmitter;

a channel information acquirer which calculates, based on the reference signals received by the transmitter, a channel information matrix H whose elements represent transfer functions of respective communication sub-channels of the channel each of which links one of the antennas of the transmitter and one of the antennas of the receiver;

an SVD unit which performs a singular value decomposition of the channel information matrix H to yield $UDV^H$, so as to obtain a transmit antenna weighting coefficient matrix V whose entries represent weighting vectors for the respective antennas of the transmitter; and a signal sender which sends the components of the signal from the respective antennas of the transmitter to the receiver with the components weighted by the respective weighting vectors.

It is noted that the term "system" means a logical assembly of a plurality of apparatuses (or functional modules for realizing respective specific functions); the apparatuses or functional modules may or may not be enclosed in a single housing.

According to the present invention, instead of feeding back the antenna weighting coefficient matrix V of the transmitter, which is obtained by performing a singular value decomposition of the channel information matrix obtained by the receiver, the receiver sends the reference signals or symbols to the transmitter on which part a singular value decomposition is performed to obtain a transmit antenna weighting coefficient matrix V necessary when transmitting data. Thus, an amount of information fed back to the transmitter from the receiver can be reduced.

Further, even though the amount of the information fed back is reduced, the transmitter sends data where the transmit antenna weighting coefficient matrix V is applied, the receiver can obtain a satisfactory decoding capability with a reduced number of antennas.

A second aspect of the invention provides a wireless communications system taking account of a transfer function of a communications channel between a transmitter and a receiver each having an antenna, the system comprising:

a calibration coefficient obtainer which obtains a calibration coefficient for each of the antennas of the transmitter and the receiver;

a reference signal feedback unit which feeds back a reference signal as compensated on the part of the receiver by using the calibration coefficient for the antenna of the receiver, to the transmitter;

a transfer function calculator which compensates, on the part of the transmitter, the received reference signal by using the calibration coefficient for the antenna of the transmitter, and obtains a transfer function based on the compensated reference signal; and a data sender which transmits data using the transfer function.

For instance, the wireless communications system according to the second aspect of the invention employs a scheme where each of the transmitter and receiver has plural antennas, and a signal is multiplexed to be sent over a plurality of sub-channels each linking an antenna of the transmitter and an antenna of the receiver.

In this case, the calibration coefficient obtainer obtains calibration coefficients of the respective antennas on the part of both the transmitter and the receiver, while the reference signal feedback unit sends, by time division, the reference signals for the respective antennas of the receiver (hereinafter referred to as "receive antennas") as compensated by using the respective calibration coefficients. The transfer function calculator operates on the part of the transmitter to: compensate the reference signals received by the antennas of the transmitter (hereinafter referred to as the "transmit antennas"), by using the calibration coefficients for the respective antennas; calculate the transfer functions based on the compensated reference signals; obtain a channel information matrix H' in the inverse direction from the receiver to the transmitter, whose elements represent the transfer functions of the respective sub-channels; and acquire a transmit antenna weighting coefficient matrix V whose entries represent weighting vectors of the respective the transmit antennas, by performing a singular value decomposition of the channel information matrix H' to yield U'D'V'$^H$. The data sender sends the components of the signal from the respective antennas of the transmitter to the receiver with the components weighted by the respective weighting vectors.

The transmitters ends the reference signals for the respective transmit antennas by time division, and the receiver calculates the transfer functions based on the reference signals received by the respective receive antennas so as to obtain a channel information matrix H in the forward direction whose elements represent the transfer functions of the sub-channels each linking a transmit antenna and a receive antenna, performs a singular value decomposition of the channel information matrix H to yield UDV$^H$ to obtain the receive antenna weighting coefficient matrix U whose element vectors represent the weighting vectors of the respective receive antennas. In this case, the receiver receives the data transmitted in the form of the data signals through the receive antennas, and decodes the signals using the receive antenna weighting coefficient matrix U$^H$.

In the SVD-MIMO transmission system, instead of performing a singular value decomposition of the channel information matrix H as received by the receiver to yield UDV$^H$ so as to obtain the transmit antenna weighting coefficient matrix V and feeding back the matrix V to the transmitter, the receiver sends the reference signals or symbols to the transmitter, thereby reducing an amount of information fed back to the transmitter from the receiver. However, there is a problem that reversibility between the transfer functions of the channel in the uplink and downlink directions can not be assured since the transfer functions of the channel is affected by variation in the characteristic of the RF transmitting and receiving analog circuits of the transmitter and receiver. Thus, the antenna weighting coefficient matrix V' which is obtained by sending the reference signals or symbols from the receiver to the transmitter and performing the singular value decomposition on the part of the transmitter does not coincide with the antenna weighting coefficient matrix V in the direction from the transmitter to the receiver.

On the other hand, in the wireless communications system according to the second aspect of the invention, the calibration coefficients of the antennas of the transmitter and receiver are obtained, and the calibration coefficients for the receive antennas is used for calibrating the reference signals upon feedback thereof while the calibration coefficients for the transmit antennas is used when calculating the transfer functions based on the reference signals. Thus, the noncoincidence between the channel information matrices in the opposite directions can be compensated for.

The invention can provide the excellent wireless communications system, wireless communication method and wireless communications apparatus, where the pair of the transmitter and receiver each having the plural antennas is capable of making a communication using space division multiplexing (MIMO communication) in which the transmission capacity is enhanced.

Further, the invention can provide the excellent wireless communications system, wireless communication method and wireless communications apparatus, which are capable of performing a MIMO transmission using the singular value decomposition (SVD) of the channel information matrix each of whose elements corresponds to the characteristic of each sub-channel linking each pair of a transmit antenna and a receive antenna.

The invention can also provide the excellent wireless communications system, wireless communications method and wireless communications apparatus, which are capable of reducing the amount of information fed back from the receiver to the transmitter in performing the SVD-MIMO transmission.

According to the invention, instead of performing a singular value decomposition of the channel information matrix as received by the receiver to obtain the transmit antenna weighting coefficient matrix V and feeding back the obtained matrix V to the transmitter, the receiver sends the reference signals or symbols to the transmitter which performs a singular value decomposition to obtain the transmit antenna weighting coefficient matrix V necessary when transmitting data. Thus, an amount of information fed back to the transmitter from the receiver can be reduced. The noncoincidence between the channel information matrices in the opposite directions can be compensated for, by implementing a calibration for compensating an error related to a transmission/reception analog device of both of the transmitter and the receiver.

Incidentally, in addition to the above-mentioned related art, there have been proposed by the present inventors techniques related to the present invention as disclosed in unpublished Japanese Patent Application Nos. 2003-426294, 2004-040934, 2004-140485, 2004-140488 and 2004-140486.

The further objects, features and advantages of the invention will be clarified by the more detailed illustration of the invention based on embodiments of the invention as described below and accompanying drawings.

BRIEF DESCRIPTION OF THE DRAWINGS

FIG. 3 is a view for illustrating a reversibility of transfer functions of a communications channel in the uplink and downlink directions.

FIG. 4 schematically shows a structure of a communications apparatus having a plurality of antenna elements.

FIG. 5 is a view for illustrating a procedure of obtaining a loopback transfer function implemented in the apparatus of FIG. 4.

DETAILED DESCRIPTION OF THE PREFERRED EMBODIMENTS

There will be described embodiments of the invention by reference to the drawings.

In this invention, a receiver does not feed back to a transmitter a transmit antenna weighting coefficient matrix V as obtained by performing a singular value decomposition of a channel information matrix H obtained by the receiver to yield $UDV^H$, but sends reference signals or symbols to a transmitter, so that the transmitter performs a singular value decomposition to obtain the transmit antenna weighting coefficient matrix V necessary when transmitting data. The amount of information fed back to the transmitter from the receiver can be thus reduced.

Figure 1:
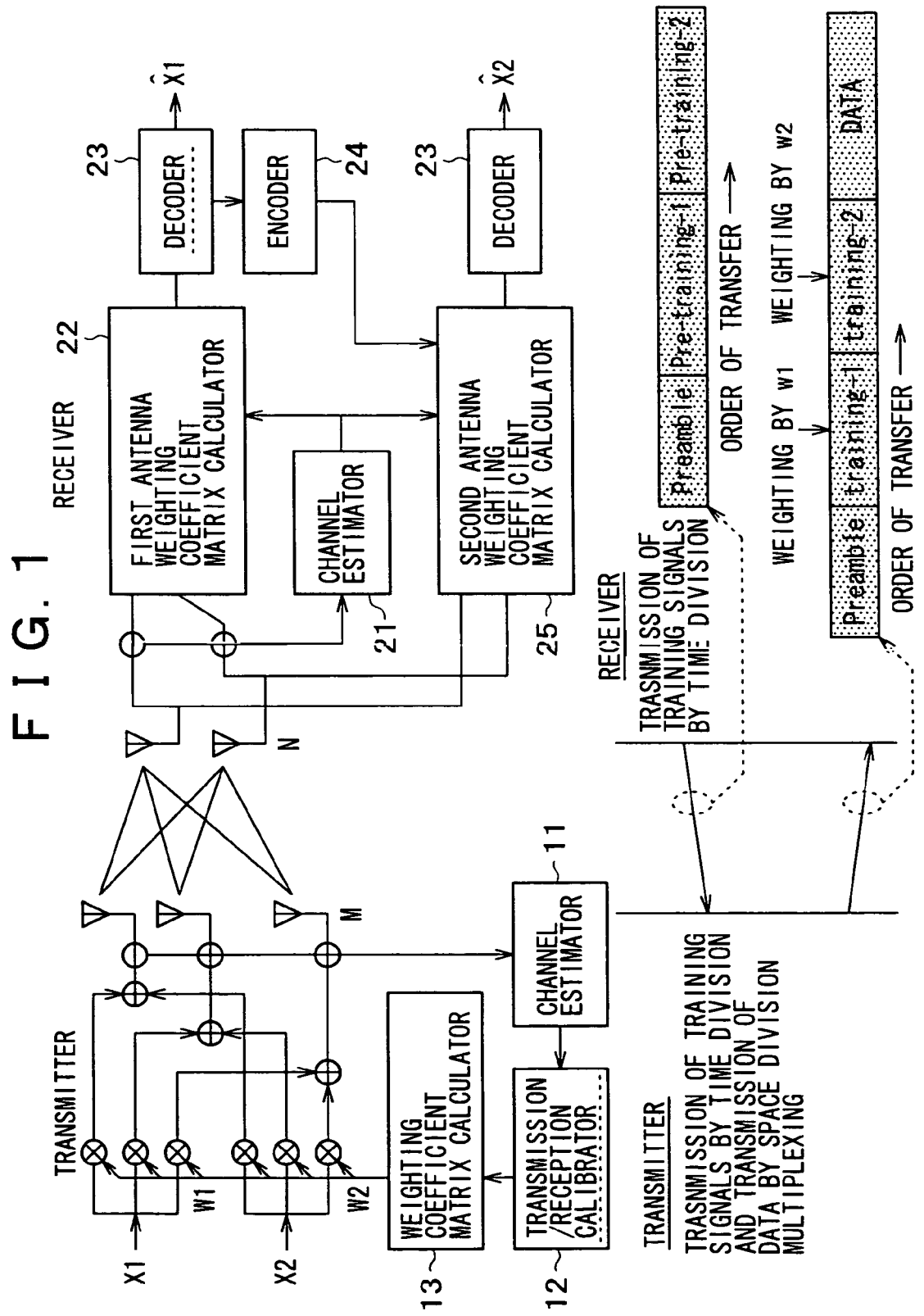
FIG. 1 schematically shows a construction of a MIMO communications system according to a first embodiment of the invention.

FIG. 1 schematically shows a construction of an SVD-MIMO communications system according to a first embodiment of the invention.

A transmitter space-time encodes each transmitted signal to multiplex the signal and distributes the multiplexed signal to three antennas to send the signal therefrom to a receiver over a channel. The receiver receives the multiplexed signal via the channel through two antennas and space-time decodes the signal to obtain received signal or data.

Figure 9:
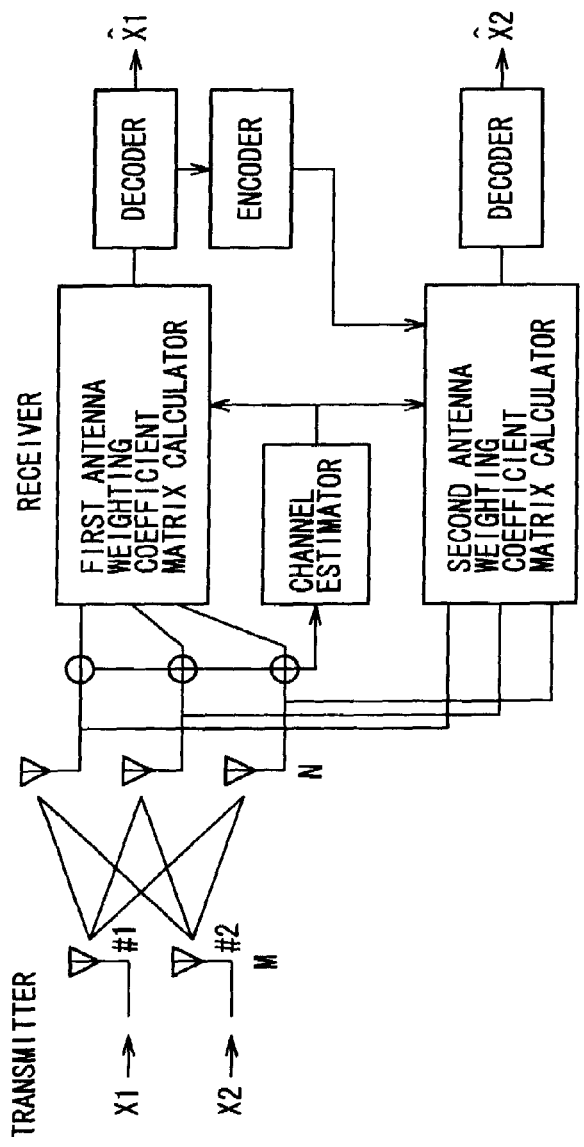
FIG. 9 illustrates a concept of V-BLAST communications system.
Figure 9:
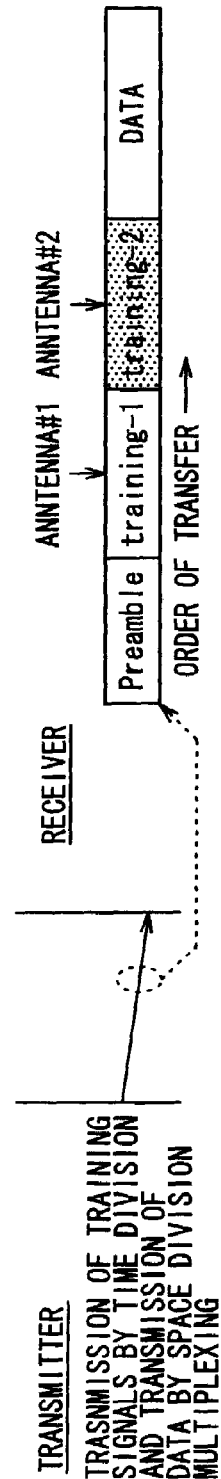

The communications system shown resembles the V-BLAST system shown in FIG. 9 in general. However, the transmitter, not the receiver, provides an antenna weighting coefficient when transmitting the data, and the antenna configuration of the transmitter and receiver is such that the number of the transmit antennas is larger than that of the receive antennas. The number of the receive antennas corresponds to the number of signal sub-channels.

In the system shown in FIG. 1, the part of the transmitter has a redundancy in the degree of freedom of the antennas. To take advantage of this redundancy for improving the S/N ratio of the received signal, the transmitter sends a signal weighted by MSN (Maximum Signal-to-Noise ratio) which is criteria for maximizing the S/N ratio of signal of self, by zero-forcing, or by a combination of the MSN and zero-forcing. As a result, even where a redundancy in the degree of freedom of the antennas on the part of the receiver is not available (that is, the number of receive antennas is relatively small), the degree of freedom on the part of the transmitter can compensate this, to assure a satisfactory decoding capability.

The operational procedure in the present communications system will be described.

As a preparatory step, a training signal "Pre-training Signal" as a reference symbol with respect to each antenna is sent from the receiver 20 in a time division fashion. In the specific example of FIG. 1, the receiver has two receive antennas, and therefore two Pre-training Signals are sent. A preamble "Preamble" prefixed to the "Pre-training Signal" is an additive signal for serving a signal detection, a timing synchronization and an adjustment of receiver gain.

The transmitter 10 receives the training signal from the receiver 20 as a reference signal, calculates the channel information matrix H by a channel estimator 11 of the transmitter 10, and determines a transmit antenna weighting coefficient matrix $Z_T$ by a transmit antenna weighting coefficient matrix calculator 13 by applying the MSN, zero-forcing, or combination of these, with respect to each antenna.

Subsequently, the transmitter 10 sends a concatenation of training signals and a signal as a component of the signal indicative of the data of interest, which is obtained by multiplexing the signal by space division. The training signals are weighted for reflecting the characteristics of the respective corresponding antennas by using the matrix $Z_T$ obtained as described above. It is particularly noted that even in the period where the training signals are sent out, the weighting for reflecting the characteristics of the corresponding antennas is performed for each signal multiplexed. In the example of FIG. 1, training signals Training-1 and Training-2, which are respectively subjected to weighting by element vectors $w_1$ and $w_2$ of the antenna weighting coefficient matrix $Z_T$ (=[$w_1$, $w_2$]), are sent by time division.

On the other hand, a channel estimator 21 of the receiver 20 calculates a channel information matrix H' each element of which corresponds to a pair of one of the transmit weighting coefficient vectors and a corresponding receive antenna, based on the training signals Training-1 and -2 as weighted with respect to respective signal components sent in a multiplexed fashion.

A first receive antenna weighting coefficient matrix calculator 22 performs zero-forcing for each transmit antenna to cancel the unnecessary signals other than a signal related to the receive antenna itself, so as to obtain a receive antenna weighting coefficient matrix $Z_R$. Among the signals retrieved after the matrix $Z_R$ is provided, the signal exhibiting the highest S/N ratio is first decoded by a decoder 23 into $x_1$.

Next, the encoder 24 encodes the signal as decoded once again to produce a replica (duplicate) of the transmitted signal, which is canceled from a signal just received by the antenna. A second receive antenna weighting coefficient matrix calculator 25 excludes the corresponding transmit antenna and performs again zero-forcing for the signal to calculate a receive antenna weighting coefficient matrix $Z_R'$. The signal $x_2$ exhibiting the highest S/N ratio among the remaining received signals is retrieved to be decoded by the decoder 23. In the second decoding operation, since the transmitted signal as first decoded is eliminated, the degree of freedom of the receive antennas is increased, accordingly enhancing the effect of maximal ratio combining. By iterating the above-described processing, all the multiplexed transmitted signals are decoded in sequence.

The first embodiment is such that the transmitter 10 performs transmission of signals by using the MSN, zero-forcing, or combination of these, in weighting the signals. Thus, the degree of freedom of the transmit antennas is fully exploited, enhancing the S/N ratio of the received signals. Hence, even where there is no redundancy in the degree of freedom of antennas on the part of the receiver 20, the redundancy of the degree of freedom on the part of the transmitter can compensate this.

Figure 2:
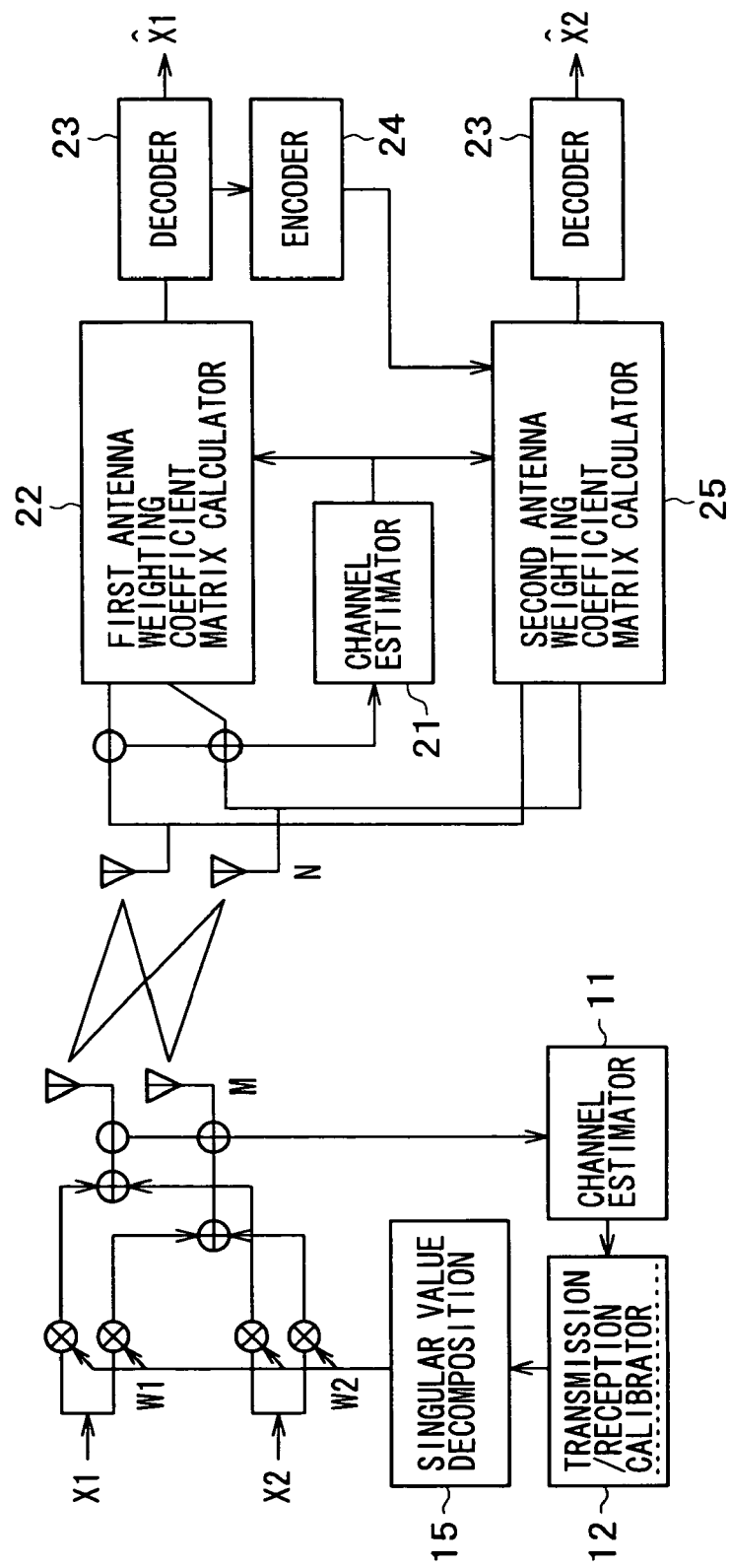
FIG. 2 schematically shows a construction of a MIMO communications system according to a second embodiment of the invention.

FIG. 2 is a diagram illustrating a construction of a communications system according to a second embodiment of the invention.

The system of FIG. 2 is identical with the system of FIG. 1 in that each transmitted signal multiplexed on the part of the transmitter is space-time decoded to be distributed to plural antennas through which the signal components are sent to the receiver over respective sub-channels of a channel in a multiplexed fashion, and the receiver space-time decodes the signal components received through plural antennas via the sub-channels to obtain a received signal or data.

In the embodiment of FIG. 1, the transmit antenna weighting coefficient matrix calculator 13 determines, for each antenna, the transmit antenna weighting coefficient matrix $Z_T$ by the MSN, zero-forcing, or combination of these, based on the channel information matrix H obtained by a calculation using the training signals from the receiver 20. On the other hand, the second embodiment shown in FIG. 2 is such that a singular value decomposition unit 15 employs the SVD (Singular Value Decomposition) in calculating the transmit antenna weighting coefficient, and weights the signal by the weighting coefficient matrix V before transmission of the signal.

When zero-forcing criteria is applied to the training signals sent with weighted by V, the weighting coefficient matrix on the part of the receiver 20 necessarily becomes $U^H$. Therefore, it is obvious that if the SVD calculation on the part of the transmitter 10 is allowed, a SVD-MIMO transmission without communication of $U^H$ to the receiver 20 is enabled, omitting the necessity to perform the singular value decomposition on the part of the receiver 20. That is, according to the present embodiment, a MIMO system with 2×2 antennas can be relatively easily realized.

On the part of the receiver 20, the channel estimator 21 calculates a channel information matrix H' each element of which corresponds to a pair of one of the transmit weighting coefficient vectors and a corresponding receive antenna. The first receive antenna weighting coefficient matrix calculator 22 performs zero-forcing for each transmit antenna to cancel unnecessary signals other than the signal related to the receiver itself, to obtain a receive antenna weighting coefficient matrix $U^H$. The signal exhibiting the highest S/N ratio among the received signals retrieved after $U^H$ is provided is decoded by a decoder 23 to obtain a signal $x_1$.

Thereafter, the decoded signal is again encoded by an encoder 24, to produce a replica (duplicate) of the transmitted signal which is canceled from a received signal just received by the antenna. A second receive antenna weighting coefficient matrix calculator 25 excludes the transmit antenna corresponding to the transmitted signal subjected to the canceling, and again applies zero-forcing to the signal to calculate a receive antenna weighting coefficient matrix $U^H$. The signal $x_2$ exhibiting the highest S/N ratio among the remaining received signals is retrieved and decoded by the decoder 23. Or alternatively, the second multiplexed signal $x_2$ may be directly retrieved from each received signal retrieved after the first receive antenna weighting coefficient matrix calculator 22 has provided $U^H$.

Meanwhile, there is a problem that there is a noncoincidence between channel characteristics of a transmitting circuit and a receiving circuit of the transmitter 10. This is because of the following fact: Although the spatial transfer function shows a reversibility, the channel information matrix H, which is a function of the following factors: an RF environment (transfer function) on the side of the transmitter 10, a construction (transfer function) of the channel space, and an RF environment (transfer function) on the side of the receiver 20, where the transfer functions related to the transmitter 10 and receiver 20 show variation due to variation in characteristics of the RF transmitting and receiving analog circuits, is not assured of a reversibility between the uplink and downlink directions.

A channel transfer function as measured in the direction from the transmitter to the receiver has factors including a spatial transfer function showing reversibility, and a transmitter transfer function involving variation in the characteristic of the RF analog transmitting portion of the transmitter and a receiver transfer function involving variation in the characteristic of the RF analog receiving portion of the receiver, as irreversibility components. On the other hand, the channel transfer function measured in the opposite direction (from the receiver to the transmitter) has factors including the spatial transfer function showing reversibility, and a transmitter transfer function involving variation in the characteristic of the RF analog transmitting portion of the receiver and a receiver transfer function involving variation in the characteristic of the RF analog receiving portion of the transmitter, as irreversibility components. Hence, the channel transfer function as measured in the direction opposite to the direction of an actual data transmission is affected by the transfer functions of the transmitting RF analog circuit of the receiver and of the receiving RF analog circuit of the transmitter. See FIG. 3.

This irreversibility does not matter when the transmit antenna weighting coefficient matrix V obtained by the singular value decomposition of the channel information matrix as acquired by the receiver is fed back to the transmitter. However, where the antenna weighting coefficient matrix V' which is necessary for the transmitter in sending the data is obtained such that the receiver sends the reference signals or symbols to the transmitter which then performs the singular value decomposition, the matrix V' does not coincide with the antenna weighting coefficient matrix V for the direction from the transmitter to the receiver. Thus, a calibration is required.

The calibration is more specifically described. The entry $h_{ij}$ of the channel information matrix H represents a transfer function of a sub-channel linking the j-th transmit antenna to the i-th receive antenna, and is expressed by the following equation (8):

$$h_{ij} = \text{Transfer function of a } j\text{-th transmitting RF analog} \\ \text{circuit of the transmitter} \times \text{Spatial transfer function} \times \text{Transfer function of an } i\text{-th receiving RF} \\ \text{analog circuit of the receiver} \qquad (8)$$

On the other hand, a transfer function $h_{ij}'$ of the sub-channel in the opposite direction, namely, a channel linking the i-th receive antenna to the j-th transmit antenna, is expressed by the following equation (9).

$h_{ij}'$=Transfer function of an *i*-th transmitting RF analog circuit of the receiver×Spatial transfer function×Transfer function of a *j*-th receiving RF analog circuit of the transmitter (9)

It is typical that the transfer functions of respective analog circuits are different from one another, due to the manufacturing error and depending upon the temperature, for instance. Accordingly, in the sub-channel linking the j-th antenna of the transmitter and the i-th antenna of the receiver, the transfer function $h_{ij}$ in the forward direction (i.e., from the transmitter to the receiver) and the transfer function $h_{ij}'$ in the reverse direction are different. Thus, in the method where the transmitter performs a singular value decomposition of H' to derive an equation $H'=U'D'V'^H$, while the receiver performs a singular value decomposition of H to derive an equation $H=UDV^H$, so that the transmitter weights the signal of interest by the antenna weighting coefficient matrix V' and sends the weighted signal to the receiver which decodes the received signal with weighting the signal by the matrix $U^H$, logically independent sub-channels of a channel can not be provided.

To solve the above-described problem, in the invention both the transmitter and receiver performs the calibration for compensating the error in the characteristic of the transfer functions of the transmitting and receiving analog circuits, so that a correct transmit antenna weighting coefficient matrix V' can be derived from the channel information matrix H' of the reverse direction.

The calibration referred to here corresponds to, for instance, a technique used for making the directivity in the downlink identical with that in the uplink in an adaptive array antennas, and is a method for compensating an error related to transmitting and receiving analog devices. It is known in the field that in the case of a device capable of 5 GHz performance, once in a few hours is a sufficient frequency of the calibration.

The transmitter performs the calibration at a frequency, e.g., once in a few hours, and holds the calibration coefficient. The receiver also performs the calibration once in a few hours and holds the calibration coefficient.

When the reference signals or symbols for yielding the channel information matrix H' in the reverse direction, i.e. the channel information matrix of the uplink, is sent from the receiver to the transmitter, the receiver first implements the calibration using the calibration coefficient and sends the calibrated reference symbols. The transmitter implements the calibration using the calibration coefficient for the received reference symbols (see equation (9)) and performs the singular value decomposition of the channel information matrix H' constituted by the calibrated transfer functions, to obtain the transmit antenna weighting coefficient matrix V'.

There will be next described a method of the calibration. The transmitter and receiver independently perform the calibration.

FIG. 4 schematically shows a structure of a communications apparatus having a plurality of antennas, focusing on the antennas and its vicinity.

A transmitting analog circuit Tx1 and a receiving analog circuit Rx1 belong to an antenna #1. Since the characteristics of the respective analog circuits Tx and Rx are different from each other, the calibration is required.

In one of methods of the calibration, a coupler is provided on the output side of the transmitting analog circuit belonging to an antenna of one of a plurality of antenna systems or elements, so that a loopback path, as shown in FIG. 4, which is connected to a receiving analog circuit belonging to another antenna is made.

A loopback transfer function is obtained as follows. As shown in FIG. 5, a coupler is provided on the output side of a transmitting analog circuit belonging to the antenna #2, to enable acquisition of the reverse loopback transfer function.

With employing one of transmitting and receiving RF circuits as a reference, a ratio of a transfer function of each RF circuit to the reference is obtained. Where the RF circuit belonging to the antenna #1 is employed as a reference, the following transfer function can be obtained from the loopback shown in FIG. 4:

$$T_1 \exp(j\mu_1) R_i \exp(j\theta_i) \quad (10)$$

Similarly, the following transfer function can be obtained from the loopback shown in FIG. 5:

$$R_1 \exp(j\theta_1) T_i \exp(j\mu_i) \quad (11)$$

The calibration coefficient is a ratio of the former transfer function to the latter one and expressed by the following equation:

$$C_i = \frac{T_i \exp(j\mu_1) R_i \exp(j\theta_i)}{R_1 \exp(j\theta_1) T_i \exp(j\mu_i)} \quad (12)$$

In a 2×2 MIMO communications system where the number of antenna elements of both of the transmitter and the receiver is two, the calibration coefficient of the transmitter is represented by CT(i) while the calibration coefficient of the receiver is represented by CR(i), where i indicates the antenna number.

Figure 6:
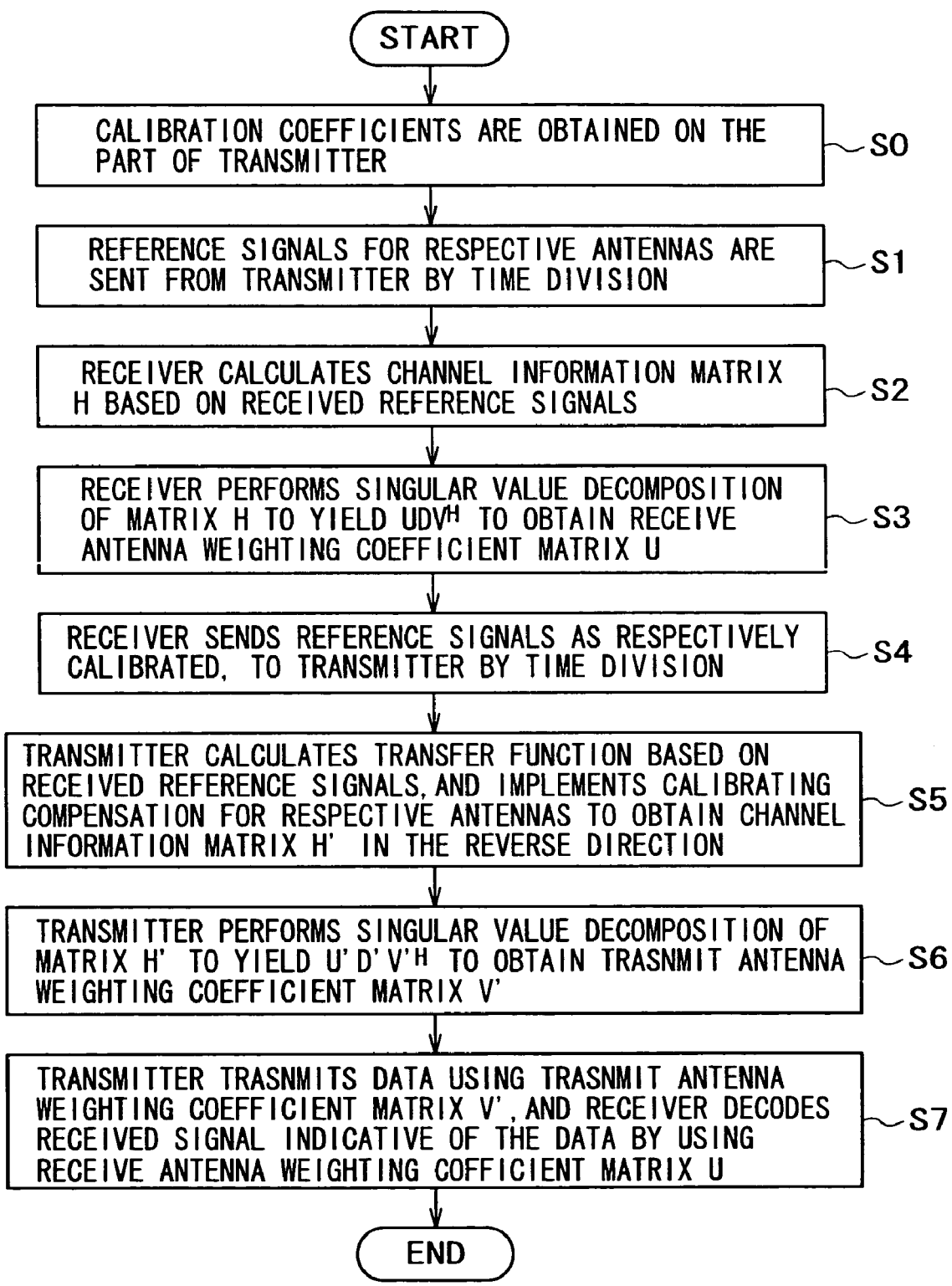
FIG. 6 is a flowchart illustrating steps of a procedure of a calibration for compensating an error in characteristics of transfer functions of transmitting and receiving analog circuits.
Figure 7:
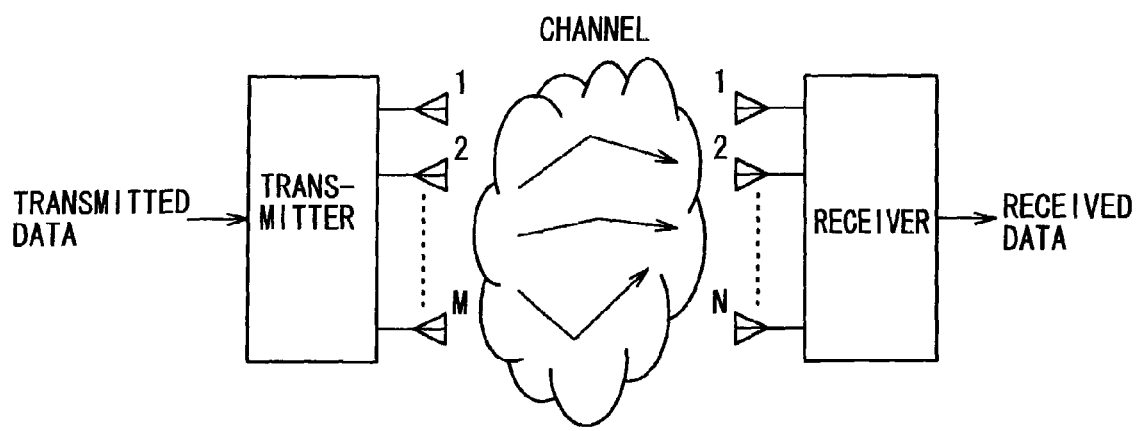
FIG. 7 illustrates a concept of MIMO communications system.
Figure 8:
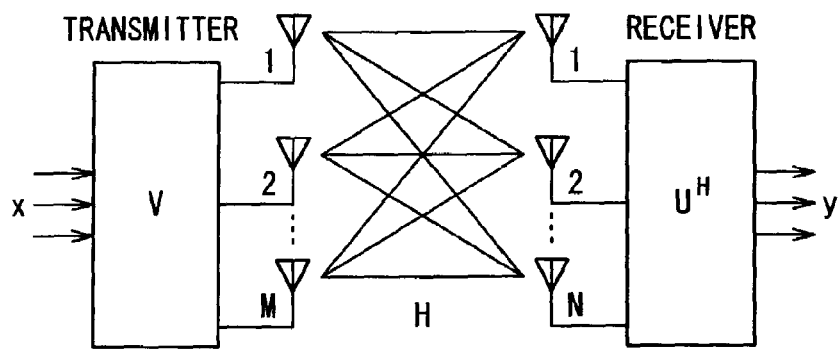
FIG. 8 illustrates a concept of SVD-MIMO transmission system.

A procedure of the calibration for compensating the error of the characteristics of the transfer functions of the transmitting and receiving analog circuits will be described referring to a flowchart shown in FIG. 6.

Step 0:
The transmitter obtains the calibration coefficient CT(j) with respect to the j-th antenna of the transmitter, while the receiver obtains the calibration coefficient CR(i) with respect to the i-th antenna of the receiver.

Step 1:
The transmitter sends an OFDM symbol from each antenna j, by time division. The OFDM symbols are modulated by BPSK (Binary Phase Shift Keying).

Step 2:
The receiver receives a reference signal for each antenna j from the transmitter, and calculates a transfer function $h_{ij}$ for each antenna pair or sub-channel. In the specific example shown in FIG. 2, each of two antennas of the transmitter sends out the reference signal twice, and the signals are received by two antennas of the receiver. Thus, a total of four transfer functions can be obtained. That is, in the case of 2×2 MIMO transmission, a 2×2 channel information matrix H is obtained. The entry of the matrix H represents a transfer function having a value of a complex number.

Step 3:
The receiver performs a singular value decomposition of the channel information matrix H to yield the expression $H=UDV^H$. The receiver obtains a matrix U necessary when decoding the received signals, and a receive antenna weighting coefficient matrix $U^H$ for the decoding.

Step 4:

This time the receiver sends out an OFDM symbol as a reference signal from each antenna i, by time division. The OFDM symbols are modulated by the BPSK. A reference signal sent form an antenna 0 is compensated by a calibration coefficient CR(0), while a reference signal sent from an antenna 1 is compensated by a calibration coefficient CR(1). The calibration coefficient is held in the form of a complex transfer function, the compensation is completed by multiplying the transmitted signal by the calibration coefficient. By using CR(i) in the calibrating compensation, the transfer function expressed by the equation (9) can be made free from the influence of the variation related to the RF analog transmitting portion of the receiver.

Step 5:

The transmitter receives a reference signal for each antenna i sent from the receiver, and calculates a transfer function $h_{ij}'$ for each antenna pair or sub-channel. A reference signal received by the antenna 0 is compensated by the calibration coefficient CT(0), while a reference signal received by the antenna 1 is compensated by the calibration coefficient CT(1). By using CT(j) in the calibrating compensation, the transfer function expressed by the equation (9) can be made free from the influence of the variation related to the RF analog receiving portion of the transmitter. Then, the channel information matrix H' in the reverse direction is obtained from the transfer functions as compensated by the calibration.

The transmitter performs a singular value decomposition of the obtained channel matrix H' to yield the expression H'=U'D'V'$^H$. Then, the transmitter can obtain the transmit antenna weighting coefficient matrix V' whose entry is weighting vector [$w_1$, $w_2$] for each antenna and which is necessary when transmitting signals or data of interest.

Step 7:

An actual data communication is initiated. When transmitting the data, the transmitter weights a plurality of logically independent bit data by respective weighting vectors [$w_1$, $w_2$] as entries of the transmit antenna weighting coefficient matrix V', and sends the weighted bit data out from the respective antennas, by space-time multiplexing. On the other hand, the receiver decodes the data or signals received by the respective antennas, with using the receive antenna weighting coefficient matrix $U^H$.

The transmitter and the receiver perform the calibration beforehand according to the processing procedure as described above. When a SVD-MIMO transmission is actually performed, the weights used by the receiver are obtained on the basis of the obtained channel information matrix in regard to the direction from the transmitter to the receiver, while the weights required for data transmission by the transmitter are obtained by using the channel information matrix which is obtained by receiving from the receiver the reference signals as compensated by the calibration coefficient related to the receiver, and compensating the received reference signals by using the calibration coefficient related to the transmitter.

According to the above-described method, the transmit antenna weighting coefficient matrix V which is directly obtained from the channel matrix H acquired in regard to the direction from the transmitter to the receiver, and the weighting coefficient matrix V' on the part of the transmitter which is directly obtained from the channel matrix H for the direction from the transmitter to the receiver, and the other transmit antenna weighting coefficient matrix V' obtained from H' acquired by the calibration based on the signals sent from the receiver to the transmitter, do not in effect completely coincide with each other. Each of vectors of V is identical with a vector which corresponds to the counterpart of V' but each of whose components is rotated by an angle.

This is because of that the calibration coefficient is a value determined on the basis of a particular antenna as a reference, the value of the calibration coefficient is not an absolute value, but a relative calibration coefficient among a plurality of antenna elements.

$$C_i = \frac{T_1 \exp(j\mu_1) R_i \exp(j\theta_i)}{R_1 \exp(j\theta_1) T_i \exp(j\mu_i)} \quad (13)$$

In the above described embodiment, the calibration coefficient of each antenna i is defined on the basis of the transfer functions of the transmitting and receiving analog portions of the antenna 1 as references. Thus, the calibration coefficient is not an absolute value directly derived from the transmission transfer function of the antenna i and the reception transfer function of the antenna i, but is a relative calibration coefficient. In general, the calibration of antennas in a multi-antenna system is such a relative calibration. It is noted that the principle of the invention operates in combination with the relative calibration.

Where the weights are used for weighting data transmitted in an SVD-MIMO system, the phase rotation mentioned above does not matter at all, in effect. This is because that the optimum transmit antenna weighting coefficient matrix V is always rotating equivalently, due to a slight clock error between the transmitting and receiving devices. That is, there is no point in having V and V' identical with each other, but it is sufficient to have every component of every vector of V as rotated by a same angle identical with the corresponding component of the corresponding vector of V'. Further, since V' and V are unitary matrices, the norm of each vector of V' is identical with the norm of corresponding vector of V.

Although the invention has been described in detail by reference to specific embodiments thereof, it is to be understood that modifications of the embodiments or substitution of some elements or features in the embodiments which may occur to those skilled in the art may be made, without departing from the gist of the invention. That is, the embodiments have been described for illustrative purposes only, and the invention is not limited to the details of the embodiments. In interpreting the gist of the invention, appended claims should be well taken into consideration.

What is claimed is:

1. A wireless communications system for a communication between a transmitter and a receiver each having a plurality of antennas, over a communications channel by multiplexing a signal, the system comprising:

a reference signal sender which feeds back reference signals for respective antennas of the receiver from the receiver to the transmitter;

a first channel information acquirer which calculates, based on the reference signals received by the transmitter, a channel information matrix H whose elements represent transfer functions of respective communication sub-channels of the channel each of which links one of the antennas of the transmitter and one of the antennas of the receiver;

an SVD unit which performs a singular value decomposition of the channel information matrix H to yield UDV$^H$, so as to obtain a transmit antenna weighting coefficient matrix V whose entries represent weighting vectors for the respective antennas of the transmitter; and a signal sender which sends the components of a reference signal from the respective antennas of the transmitter to the receiver with the components weighted by the transmit antenna weighting coefficient matrix V;

a second channel information acquirer which calculates, based on the weighted reference signals received by the receiver, a channel information matrix H' corresponding to the transmit antenna weighting coefficient matrix V and respective antennas of the receiver;

a receive antenna weighting coefficient matrix decision unit, in the receiver, configured to determine a receive antenna weighting coefficient matrix based on the channel information matrix H'; and a decoder, in the receiver, configured to decode a received signal, which is received after obtaining the receive antenna weighting coefficient matrix based on the received antenna weighting coefficient matrix.

2. A wireless communications system taking account of a transfer function of a communications channel between a transmitter and a receiver each having an antenna, the system comprising:

a calibration coefficient obtainer which obtains a calibration coefficient for each of the antennas of the transmitter and the receiver by calculating a ratio of a transfer function of each of a transmission circuit and a reception circuit corresponding to each of the antennas;

a reference signal feedback unit which feeds back a reference signal as compensated on the part of the receiver by using the calibration coefficient for the antenna of the receiver, to the transmitter;

a transfer function calculator which compensates, on the part of the transmitter, the received calibrated reference signal by using the calibration coefficient for the antenna of the transmitter, and obtains a transfer function based on the compensated reference signal; and a data sender which transmits data using the transfer function.

3. The system of claim 2, wherein each of the transmitter and the receiver has a plurality of antennas, and a communication between the transmitter and the receiver is performed by multiplexing a signal indicative of data such that components of the signal is sent over respective sub-channels of the channel each of which links one of the antennas of the transmitter and one of the antennas of the receiver, wherein the calibration coefficient obtainer obtains calibration coefficients of the respective antennas on the part of both the transmitter and the receiver, wherein the reference signal feedback unit sends, by time division, the reference signals for the respective antennas of the receiver as compensated by using the respective calibration coefficients;

wherein the transfer function calculator operates on the part of the transmitter to: compensate the reference signals received by the antennas of the transmitter, by using the calibration coefficients for the respective antennas; calculate the transfer functions based on the compensated reference signals; obtain a channel information matrix H' in the inverse direction from the receiver to the transmitter, whose elements represent the transfer functions of the respective sub-channels; and acquire a transmit antenna weighting coefficient matrix V whose entries represent weighting vectors of the respective antennas of the transmitter, by performing a singular value decomposition of the channel information matrix H' to yield $U'D'V'^H$, and wherein the data sender sends the components of the signal indicative of the data from the respective antennas of the transmitter to the receiver with the components weighted by the respective weighting vectors.

4. The system of claim 3, further comprising:

a reference signal feedforward unit which sends the reference signals for the respective antennas, from the transmitter to the receiver by time division;

a second transfer function calculator which operates, on the part of the receiver, to: calculate transfer functions based on the reference signals received by the respective antennas; obtain a channel information matrix H in the forward direction whose elements represent the transfer functions of the respective sub-channels; and obtain a receive antenna weighting coefficient matrix U whose entries represent weighting vectors for the respective antennas of the receiver; and a data receiver which operates, on the part of the receiver, to receive the components of the signal indicative of the data sent from the transmitter by the respective antennas, and decodes the signal by using the receive antenna weighting coefficient matrix $U^H$.

5. A wireless communications method for a communication between a transmitter and a receiver each having a plurality of antennas, over a communications channel by multiplexing a signal, the method comprising:

feeding back reference signals for respective antennas of the receiver from the receiver to the transmitter;

calculating, based on the reference signals received by the transmitter, a channel information matrix H whose elements represent transfer functions of respective communication sub-channels of the channel each of which links one of the antennas of the transmitter and one of the antennas of the receiver;

performing a singular value decomposition of the channel information matrix H to yield $UDV^H$, so as to obtain a transmit antenna weighting coefficient matrix V whose entries represent weighting vectors for the respective antennas of the transmitter;

sending the components of a reference signal from the respective antennas of the transmitter to the receiver with the components weighted by the transmit antenna weighting coefficient matrix V;

calculating, based on the weighted reference signals received by the receiver, a channel information matrix H' corresponding to the transmit antenna weighting coefficient matrix and respective antennas of the receiver;

determining a receive antenna weighting coefficient matrix based on the channel information matrix H'; and decoding a signal received after obtaining the receive antenna weighting coefficient matrix based on the received antenna weighting coefficient matrix.

6. A wireless communications method taking account of a transfer function of a communications channel between a transmitter and a receiver each having an antenna, the method comprising steps of:

obtaining a calibration coefficient for each of the antennas of the transmitter and the receiver by calculating a ratio of a transfer function of each of a transmission circuit and a reception circuit corresponding to each of the antennas;

feeding back a reference signal as compensated on the part of the receiver by using the calibration coefficient for the antenna of the receiver, to the transmitter;

compensating, on the part of the transmitter, the received calibrated reference signal by using the calibration coefficient for the antenna of the transmitter, and obtaining a transfer function based on the compensated reference signal; and sending data using the transfer function.

7. The method of claim 6, employing a communications system wherein each of the transmitter and the receiver has a plurality of antennas, and a communication between the transmitter and the receiver is performed by multiplexing a signal indicative of data such that components of the signal is sent over respective sub-channels of the channel each of which links one of the antennas of the transmitter and one of the antennas of the receiver,

- wherein the calibration coefficient obtaining step comprises obtaining calibration coefficients of the respective antennas on the part of both the transmitter and the receiver,
- wherein the reference signal feeding back step comprises sending, by time division, the reference signals for the respective antennas of the receiver as compensated by using the respective calibration coefficients;
- wherein the compensating step comprises, on the part of the transmitter: compensating the reference signals received by the antennas of the transmitter, by using the calibration coefficients for the respective antennas; calculating the transfer functions based on the compensated reference signals; obtaining a channel information matrix H' in the inverse direction from the receiver to the transmitter, whose elements represent the transfer functions of the respective sub-channels; and acquiring a transmit antenna weighting coefficient matrix V whose entries represent weighting vectors of the respective antennas of the transmitter, by performing a singular value decomposition of the channel information matrix H' to yield $U'D'V'^H$, and wherein the data sending step comprises sending the components of the signal indicative of the data from the respective antennas of the transmitter to the receiver with the components weighted by the respective weighting vectors.

8. The method of claim 7, further comprising steps of:

sending the reference signals for the respective antennas, from the transmitter to the receiver by time division;

on the part of the receiver, calculating transfer functions based on the reference signals received by the respective antennas; obtaining a channel information matrix H in the forward direction whose elements represent the transfer functions of the respective sub-channels; and obtaining a receive antenna weighting coefficient matrix U whose entries represent weighting vectors for the respective antennas of the receiver; and on the part of the receiver, receiving the components of the signal indicative of the data sent from the transmitter by the respective antennas, and decoding the signal by using the receive antenna weighting coefficient matrix $U^H$.

* * * * *